(12) United States Patent
Murakami (10) Patent No.: US 11,040,456 B2
(45) Date of Patent: Jun. 22, 2021

(54) ROBOT OPERATING APPARATUS PROVIDED WITH HANDLES FOR OPERATING ROBOT

(71) Applicant: Fanuc Corporation, Yamanashi (JP)

(72) Inventor: Wataru Murakami, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 148 days.

(21) Appl. No.: 16/372,570

(22) Filed: Apr. 2, 2019

(65) Prior Publication Data

US 2019/0224855 A1 Jul. 25, 2019

Related U.S. Application Data

(63) Continuation of application No. 15/281,874, filed on Sep. 30, 2016, now Pat. No. 10,300,608.

(30) Foreign Application Priority Data

Oct. 2, 2015 (JP) .................................. 2015-196703

(51) Int. Cl.
*B25J 13/08* (2006.01)
*B25J 9/00* (2006.01)
(Continued)

(52) U.S. Cl.
CPC .......... *B25J 13/085* (2013.01); *B25J 9/0081* (2013.01); *B25J 9/1612* (2013.01); *B25J 9/1651* (2013.01); *B25J 9/1656* (2013.01); *G05B 19/423* (2013.01)

(58) Field of Classification Search
CPC ........ G05B 19/423; G05B 2219/36433; G05B 2219/39319; G05B 2219/39529;
(Continued)

(56) References Cited

U.S. PATENT DOCUMENTS 4,517,853 A * 5/1985 Tani .......................... B25J 9/041
74/89.32
6,212,443 B1 4/2001 Nagata et al.
(Continued)

FOREIGN PATENT DOCUMENTS

JP 62162492 A 7/1987
JP 6487174 A 3/1989
(Continued)

OTHER PUBLICATIONS

Entire patent prosecution history of U.S. Appl. No. 15/281,874, filed Sep. 30, 2016, entitled "Robot Operating Apparatus Provided with Handles for Operating Robot."

*Primary Examiner* — Jason Holloway
(74) *Attorney, Agent, or Firm* — RatnerPrestia (57) ABSTRACT

A robot operating apparatus includes a force sensor mounted on the distal end part of an arm unit and a handle supporting unit mounted on the distal end part of the arm unit via the force sensor. The handle supporting unit supports two handles, and a handle structure including the two handles has two force points where forces are applied while being gripped with both hands. The force sensor detects a resultant force of forces acting on the two force points, and transmits the same to a robot control apparatus, so that the distal end part of the arm unit moves in accordance with a direction and a magnitude of the resultant force detected by the force sensor.

1 Claim, 5 Drawing Sheets (51) Int. Cl.
  *B25J 9/16* (2006.01)
  *G05B 19/423* (2006.01)
(58) Field of Classification Search
  CPC . G05B 2219/36457; G05B 2219/40201; B25J 9/0081; B25J 9/1651; B25J 9/1612; B25J 13/085; B25J 13/02; B25J 13/08; B25J 9/1656; G01L 5/226
  See application file for complete search history.

(56) References Cited

U.S. PATENT DOCUMENTS

| | | | |
|---|---|---|---|
| 8,909,374 | B2 | 12/2014 | Fudaba et al. |
| 9,393,687 | B2 | 7/2016 | Hietmann et al. |
| 9,902,059 | B2 | 2/2018 | Sonoda |
| 9,919,422 | B1 | 3/2018 | Horton |
| 10,078,327 | B2 * | 9/2018 | Takayama ............... B25J 9/0087 |
| 2005/0222714 | A1 | 10/2005 | Nihei et al. |
| 2008/0140257 | A1 * | 6/2008 | Sato ..................... B25J 9/1638 700/258 |
| 2009/0216378 | A1 | 8/2009 | Murayama |
| 2011/0190932 | A1 | 8/2011 | Tsusaka et al. |
| 2011/0208355 | A1 | 8/2011 | Tsusaka |
| 2013/0023860 | A1 | 1/2013 | Nagashimada |
| 2014/0039521 | A1 | 2/2014 | Mohr et al. |
| 2015/0081099 | A1 | 3/2015 | Komatsu et al. |
| 2015/0290809 | A1 | 10/2015 | Nakagawa et al. |
| 2016/0052128 | A1 | 2/2016 | Zimmermann et al. |
| 2016/0059407 | A1 | 3/2016 | Sonoda |
| 2017/0254709 | A1 * | 9/2017 | Lauzier ..................... G01L 1/14 |

FOREIGN PATENT DOCUMENTS

| | | |
|---|---|---|
| JP | 10249769 A | 9/1998 |
| JP | 2005154047 A | 6/2005 |
| JP | 2010264527 A | 11/2010 |
| JP | 2011036964 A | 2/2011 |
| JP | 2011093062 A | 5/2011 |
| JP | 3188953 B2 | 7/2011 |
| JP | 2014055985 A | 8/2014 |
| KR | 20100096908 A | 9/2010 |
| KR | 20120132864 A | 12/2012 |
| WO | 2011122516 A1 | 10/2011 |

\* cited by examiner

ROBOT OPERATING APPARATUS PROVIDED WITH HANDLES FOR OPERATING ROBOT

CROSS REFERENCE TO RELATED APPLICATIONS

This application is a Continuation of U.S. patent application Ser. No. 15/281,874, filed Sep. 30, 2016, which claims priority to Japanese Patent Application No. 2015-196703, filed Oct. 2, 2015, the contents of such applications being incorporated by reference herein.

BACKGROUND OF THE INVENTION

1. Field of the Invention

The present invention relates to a robot operating apparatus provided with handles for operating a robot.

2. Description of the Related Art

With respect to an industrial robot, in order to secure the safety of human beings, a protection barrier is provided around a movable area of the robot so as to limit the entry of human beings into the movable area of the robot. However, in recent years, industrial robots provided with a specific measure that sufficiently secures the safety of human beings are permitted to operate in an operating space shared with human beings instead of provision of the safety barrier.

Therefore, industrial robots that cooperate with human beings are preferably configured to allow human beings to operate an arm unit of the robot as necessary in order to enhance working efficiency. In order to do so, a configuration in which a robot operating apparatus for allowing human beings to operate the robot is provided at the distal end part of the arm unit has been proposed (for example, Japanese Patent publication No. 3188953).

Figure 8:
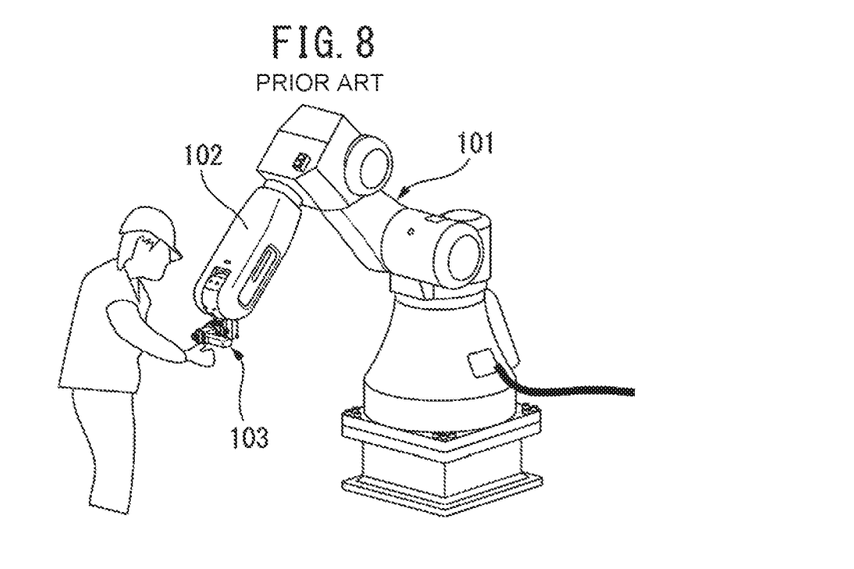
FIG. 8 is a perspective view illustrating an example of a robot provided with a robot operating apparatus of the related art.
Figure 9:
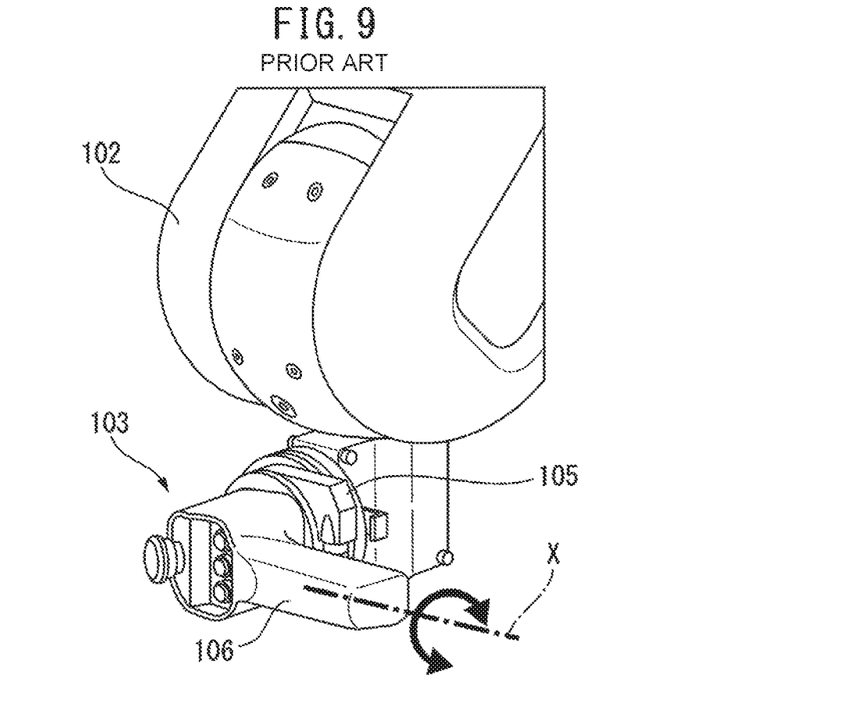
FIG. 9 is a perspective view of the robot operating apparatus illustrated in FIG. 8 in an enlarged scale.

FIG. 8 is a perspective view illustrating an example of a robot provided with a robot operating apparatus of the related art, and FIG. 9 is a perspective view of the robot operating apparatus illustrated in FIG. 8 in an enlarged scale.

As illustrated in FIG. 8, a robot operating apparatus 103 is mounted on the distal end part of an arm unit 102 of a robot 101.

Specifically, as illustrated in FIG. 9, the robot operating apparatus 103 includes a force sensor 105 mounted on the distal end part of the arm unit 102, and a handle 106 connected to the force sensor 105. When an operator grips the handle 106 and applies a force to the handle 106 in a direction in which the arm unit 102 is moved, the direction, and magnitude of the force are detected by the force sensor 105 as electric signals, and are transmitted to a robot control apparatus (not illustrated). Accordingly, the robot control apparatus moves the distal end part of the arm unit 102 in accordance with the direction and magnitude of the detected force.

However, the robot operating apparatus 103 of the related art illustrated in FIG. 9 has a structure including one rod-shaped handle 106 projecting sideways from the force sensor 105, which is subjected to application of a force by the operator. In this structure, it is difficult for the operator to grip the handle 106 and applying a force to the arm unit 102 in a rotational direction about an axial line X of the handle 106 (see FIG. 9).

Therefore, the robot operating apparatus 103 of the related art has a problem in ease of movement of the distal end part of the arm unit 102 as the operator intends.

SUMMARY OF INVENTION

The present invention provides a robot operating apparatus that is capable of moving the distal end part of an arm unit as an operator intends.

According to a first aspect of the present invention, a robot operating apparatus including; a sensor mounted on the distal end part of an arm unit of an industrial robot that is Controlled by a control apparatus and configured to detect a force or moment; and a handle supporting unit mounted on the distal end part of the arm unit via the sensor, and transmitting the force detected by the sensor to the control apparatus in a form of an electric signal to move the distal end part of the arm unit in accordance with a direction and a magnitude of the force detected by the sensor, wherein
  the handle supporting unit supports as least one handle, and a handle structure including at least one handle includes at least two force points where forces are applied while being gripped with both hands, and the sensor is adapted to detect a resultant force of forces applied to the two force points.

According to a second aspect of the present invention, the robot operating apparatus according to the first aspect wherein the handle is provided with a switch, and the robot operating apparatus is adapted to permit the distal end part of the arm unit to move only when the switch is pressed is provided.

According to a third aspect of the present invention, the robot operating apparatus according to the first or second aspect, wherein switches are provided in the vicinities of at least the two force points respectively, and the robot operating apparatus is adapted to permit the distal end part of the arm unit to move only when the two switches are pressed simultaneously is provided.

According to a fourth aspect of the present invention, the robot operating apparatus according to any one of the first to third aspect, wherein a length of a perpendicular line extending from one of the two force points down to an extension line of a force input axis of the sensor and a length of a perpendicular line extending from the other force point of the two force points down to the extension line of the force input axis of the sensor are substantially the same. In this specification and Claims, the expression "substantially the same" means that the lengths of the two perpendicular lines do not have completely the same.

According to a fifth aspect of the present invention, the robot operating apparatus according to any one of the first to fourth aspect, wherein the robot operating apparatus includes a speed change switch configured to change a speed of the distal end part of the arm unit when moving the distal end part of the arm unit, and the robot operating apparatus is adapted to send a predetermined speed command value to the control apparatus when the speed change switch is pressed is provided.

According to a sixth aspect of the present invention, the robot operating apparatus according to any one of the first to fifth aspect, including an action mode change-over switch configured to change an action mode when moving the distal end part of the arm unit, wherein the robot operating apparatus is adapted to send a command to change the action mode to a translational action, rotational action, or a translational and rotational action to the control apparatus when the action mode change-over switch is pressed is provided.

According to the seventh aspect of the present invention, the robot operating apparatus according to any one of the first to sixth aspect, including a teaching switch configured to give an instruction about an action of the arm unit to the control apparatus, wherein the robot operating apparatus is adapted to send a command to give an instruction about an action of the arm unit to the control apparatus when the teaching switch is pressed is provided.

According to an eighth aspect of the present invention, the robot operating apparatus according to any one of the first to seventh aspect, including a hand unit mounted on the sensor and configured to grip a workpiece, and a hand opening and closing switch configured to open and close the hand unit, wherein the robot operating apparatus is adapted to send a hand action command to the hand unit when the hand opening and closing switch is pressed is provided.

BRIEF DESCRIPTION OF THE DRAWINGS

Other objects, characteristics, and advantages as well as the objects, characteristics, advantages of the present invention described above will be clearly understood from detailed description of typical embodiments of the present invention illustrated in attached drawings.

DETAILED DESCRIPTION

Referring now to the drawings, embodiments of the present invention will be described below. In the drawings described below, the same components are denoted by the same reference numerals. Components assigned with the same reference numerals throughout the drawings are meant to have the same functions. The scales of these drawings are changed as necessary for easy understanding.

First Embodiment

Figure 1:
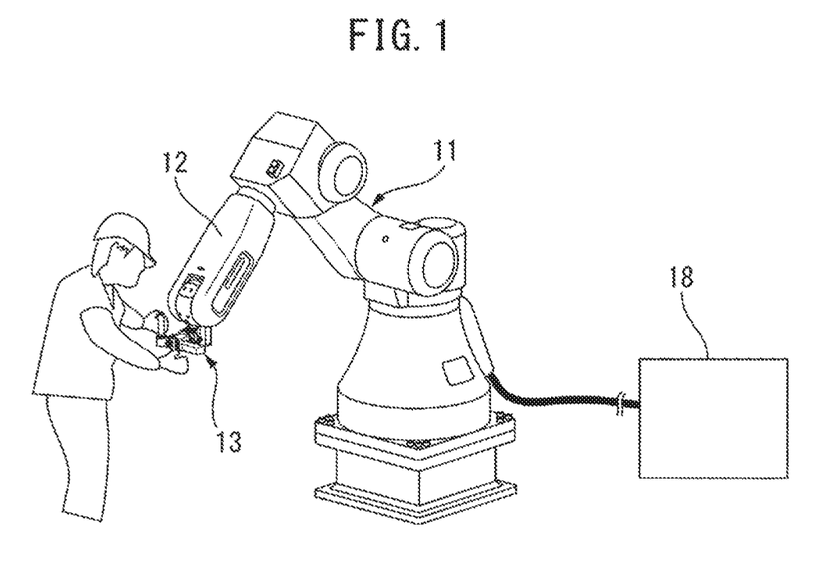
FIG. 1 is a perspective view illustrating an example of a robot provided with a robot operating apparatus according to a first embodiment.
Figure 2:
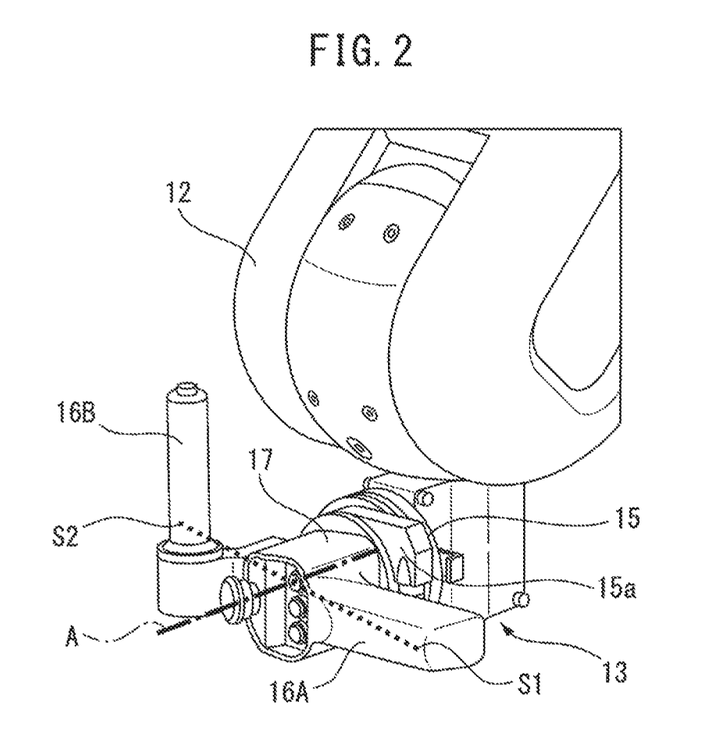
FIG. 2 is a perspective view of the robot operating apparatus illustrated in FIG. 1 in an enlarged scale.

FIG. 1 is a perspective view illustrating an example of a robot provided with a robot operating apparatus according to a first embodiment. FIG. 2 is a perspective view of the robot operating apparatus illustrated in FIG. 1 in an enlarged scale.

As illustrated in FIG. 1, a removable robot operating apparatus 13 is mounted on the distal end part of an arm unit 12 of a robot 11. The robot 11 described above is, for example, an industrial robot such as a vertical articulated robot.

The robot operating apparatus 13 of the first embodiment includes: a force sensor 15 mounted on the distal end part of the arm unit 12; and a handle supporting unit 17 mounted on the distal end part of the arm unit 12 via the force sensor 15, as illustrated in FIG. 2.

Specifically, the handle supporting unit 17 supports two rod-shaped handles 16A, 16B. The handles 16A, 16B are preferably provided integrally with the handle supporting unit 17. A handle structure including the two handles 16A, 16B have two force points S1, S2 where forces are applied while gripping the two handles 16A, 16B with both hands, respectively.

In addition, the handle supporting unit 17 described above is joined to a side surface 15a of the force sensor 15 mounted on the distal end part of the arm unit 12 as illustrated in FIG. 2.

When an operator grips the two handles 16A, 16B with both hands and applies a force in a direction in which the arm unit 12 is moved, a resultant force of the forces acting respectively on the two handles 16A, 16B is input to the force sensor 15 via the handle supporting unit 17. The force sensor 15 detects a direction and a magnitude of the resultant force input thereto, and transmits the direction and the magnitude of the detected resultant force to a robot control apparatus 18 in a form of an electric signal. The robot control apparatus 18 moves the distal end part of the arm unit 12 in accordance with the direction of the resultant force detected by the force sensor 15 and changes the speed of movement of the distal end part of the arm unit 12 in accordance with the magnitude of the resultant force detected by the force sensor 15.

In addition, in the first embodiment, the two rod-shaped handles 16A, 16B are provided respectively on both sides of the handle supporting unit 17 as illustrated in FIG. 2. The two rod-shaped handles 16A, 16B are disposed so as to form a substantially right angle with respect to each other. When one handle 16A is oriented in a horizontal direction, the other handle 16B is oriented in a vertical direction as illustrated in FIG. 2. In other words, the handle structure including the rod-shaped two handles 16A, 16B illustrated in FIG. 2 presents a mode having a substantially L-shaped handle.

Since the two handles 16A, 16B are disposed as described above, the operator is able to apply a rotational force about an axial line of the rod-shaped handle 16A easily to the arm unit 12 while gripping the two handles 16A, 16B with both hands. Such an effect is achieved not only by the mode of the substantially L-shaped handle as illustrated in FIG. 2, but also by handles of other modes described later (see FIG. 5 to FIG. 7).

The force sensor 15 of this embodiment is a general strain gauge-type force sensor (not illustrated) including: a cylindrical case; a cylindrical body adapted to be distorted upon reception of a force applied to the cylindrical case; and a plurality of strain gauges adhered to the cylindrical body. The cylindrical body is disposed in the cylindrical case with a central axis of the cylindrical body aligned with a central axis of the cylindrical case in order to cause the cylindrical body to distort as the cylindrical case distorts. The general strain gauge-type force sensor as described above detects a direction and a magnitude of a force applied to the cylindrical case described above from a twisting distortion about the central axis of the cylindrical body described above and a bending distortion with reference to the central axis of the cylindrical body described above. Considering the configuration described above, when detecting a force by the strain gauge-type force sensor, a source of generation of a force detected is preferably joined to a ceiling part or a bottom surface part of the cylindrical case, which are located in a direction of the central axis of the cylindrical body described above.

In the case of this embodiment, the side surface 15a of the force sensor 15 to which the handle supporting unit 17 is joined corresponds to the ceiling part or the bottom surface part of the cylindrical case located in the direction of the central axis of the cylindrical body described above as illustrated in FIG. 2. In this specification, the central axis of the cylindrical body described above is referred to as "force input axis", and a dot-and-dash line A indicated in FIG. 2 represents an extension line A of a force input axis of the force sensor 15.

In addition, in this embodiment, when the operator grips the two handles 16A, 16B with both hands and moves the arm unit 12, forces are applied mainly from one of the operator's hands to a position S1 (i.e., a force point S1) on one handle 16A, and from the other the operator's hand to a position S2 (i.e., a force point S2) on the other handle 16B as will be understood from FIG. 2.

In the two handles 16A, 16B configured as described above, preferably, a length of a perpendicular line extending from the force point S1 down to the extension line A of the force input axis of the force sensor 15 described above and a length of a perpendicular line extending from the force point S2 down to the extension, line A of the force input axis of the force sensor 15 described above are substantially the same (see a broken line in FIG. 2). With the configuration described above, since the force point S1 and the force point S2 are disposed on a circumference about the extension line A of the force input axis of the force sensor 15, a resultant force of forces applied to the force point S1 and the force point S2 of the two handles 16A, 16B described above may be input to the force input axis of the force sensor 15 described above with a high degree of accuracy.

Switches for executing various actions of the robot 11 are preferably provided on the two handles 16A, 16B as described above and on the handle supporting unit 17.

Figure 3:
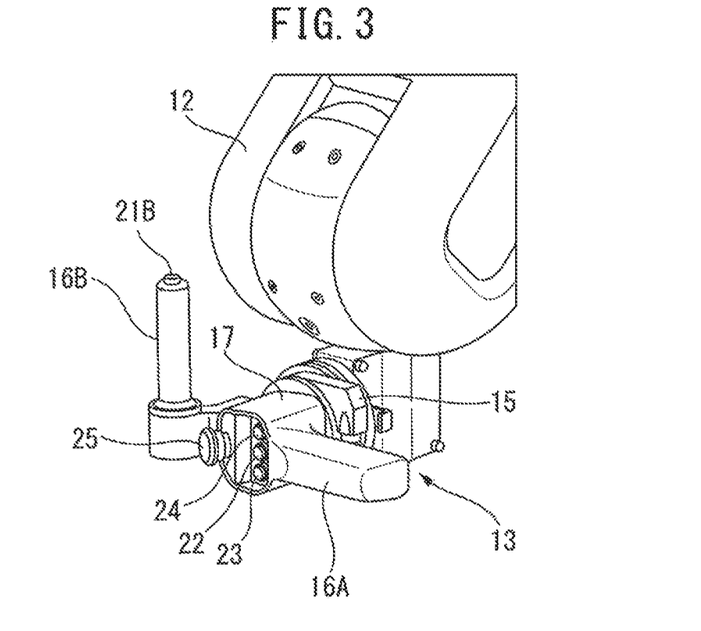
FIG. 3 is an explanatory drawing of switches provided on two handles and a handle supporting unit respectively illustrated in FIG. 2.
Figure 4:
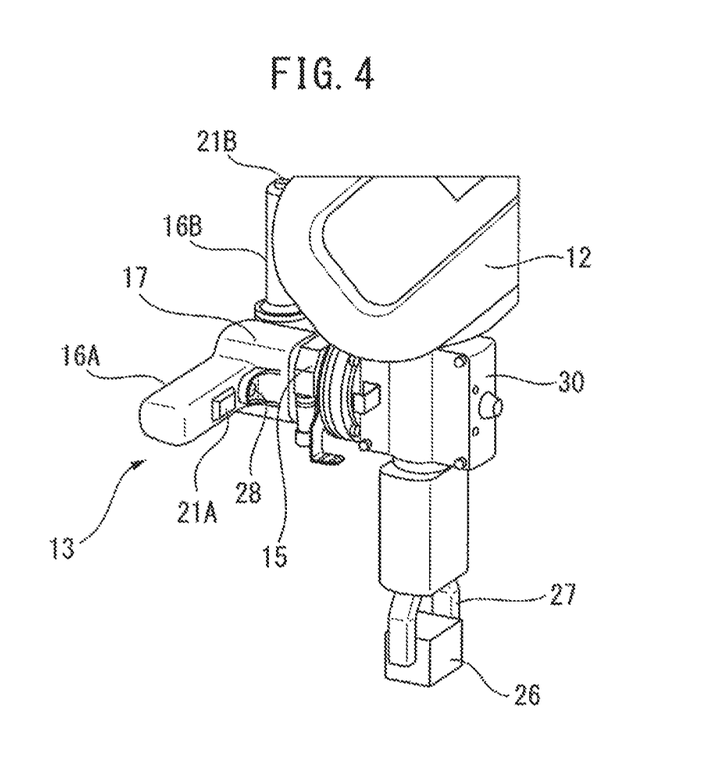
FIG. 4 is a perspective view illustrating an example of a mode of the robot operating apparatus according to the first embodiment provided with a hand unit.

Referring now to FIG. 3 and FIG. 4, the switches as described above will be described below.

FIG. 3 is an explanatory drawing of switches provided respectively on the two handles 16A, 16B and the handle supporting unit 17 illustrated in FIG. 2.

As illustrated in FIG. 3, the handle supporting unit 17 includes a speed change switch 22, an action mode change-over switch 23, a teaching switch 24, and an emergency stop switch 25.

The speed change switch 22, the action mode change-over switch 23, and the teaching switch 24 are located at positions which allow the operator to press while gripping the handle 16A.

The speed change switch 22 illustrated in FIG. 3 is a switch for changing the speed of the distal end part of the arm unit 12 achieved when the operator moves the distal end part of the arm unit 12 while gripping the two handles 16A, 16B. For example, when the speed change switch 22 is pressed, a predetermined speed command value is sent to the robot control apparatus 18, so that the distal end part of the arm unit 12 moved by the operator is allowed to move at a predetermined speed.

In addition, the speed command value described above is preferably switched every time when the speed change switch 22 described above is pressed. For example, three different speed command values, i.e., low-speed, medium-speed, and high-speed, may be provided as the speed command value described above, so that the speed command value described above may be switched to the speed command values such as the low-speed, the medium-speed, and the high-speed sequentially every time when the speed change switch 22 is pressed.

The action mode change-over switch 23 illustrated in FIG. 3 is a switch for changing an action mode when the operator moves the distal end part of the arm unit 12 while gripping the two handles 16A, 16B. For example, the action mode described above may include a translational action mode, a rotational action mode, or a translational and rotational action mode. When the action mode change-over switch 23 is pressed, a command to change the action mode described above to the translational action, the rotational action, or the translational and rotational action is sent to the robot control apparatus 18. Accordingly, the robot control apparatus 18 limits the action of the distal end part of the arm unit 12 moved by the operator to the translational action, the rotational action, or the translational and rotational action.

In addition, the action mode described above may be switched to the translational action mode, the rotational action mode, and the translational and rotational action mode in this order every time when the action mode change-over switch 23 described above is pressed.

In this embodiment, the action of the distal end part of the arm unit 12 is fixed only to the translational action, to the rotational action, or to the translational and rotational action unless the action mode described above is switched. The reason will be described below. For example, when moving the workpiece from one flat work-table to another flat work-table, if the posture of the workpiece is rotated during movement, the workpiece may not be stably placed when being placed on the work-table, and workability may be affected. In such a case, fixing the action of the distal end part of the arm unit 12 to only the translational action can facilitate the action thereof. Therefore, the action of the distal end part of the arm unit 12 is adapted to be switchable to only the translational action, to the rotational action, or to the translational and rotational action depending on the application of usage of the robot 11.

The teaching switch 24 illustrated in FIG. 3 is a switch for permitting instruction about the action of the robot 11 to the robot control apparatus 18. For example, a command to give an instruction about the action of the robot 11 is sent to the robot control apparatus 18 when the teaching switch 24 is pressed. In addition, the position or the action of the distal end part of the arm unit 12 moved by the operator may be memorized in the robot control apparatus 18. For example, the position of the distal end part of the arm unit 12 may be memorized in the robot control apparatus 18 when the teaching switch 24 is pressed. Alternatively, the action of the distal end part of the arm unit 12 while the teaching switch 24 is pressed may be memorized in the robot control apparatus 18.

The emergency stop switch 25 illustrated in FIG. 3 is a switch for urgently stopping the action of the robot 11.

In this embodiment, two action permission switches 21A, 21B are preferably provided on the two handles 16A, 16B, respectively. Since the action permission switch 21A on the handle 16A is not illustrated in FIG. 3, see FIG. 4 described later. The action permission switches 21A, 21B are also preferably located at positions which allow the operator to press while gripping the handles 16A, 16B.

Furthermore, the operation of the arm unit 12 described above is preferably performed only when each of the action permission switches 21A, 21B is pressed. More preferably, the operation to move the arm unit 12 descried above is preferably performed only when the two action permission switches 21A, 21B are pressed simultaneously. Accordingly, when danger occurs in operation of the arm unit 12 of the robot 11 by the operator, the movement of the arm unit 12 can be stopped immediately simply by stopping pressing of the switches 21A, 21B.

FIG. 4 is a perspective view illustrating an example of a mode of the robot operating apparatus 13 described above provided with a hand unit. FIG. 2 and FIG. 3 are perspective views of the robot operating apparatus 13 viewed from obliquely front of a front surface facing the operator of the robot operating apparatus 13, whereas FIG. 4 is a perspective view of the robot operating apparatus 13 viewed from obliquely rear.

In the robot 11 of this embodiment, a hand unit 27 that grips a workpiece 26 may be mounted on the distal end part of the arm unit 12 via a bracket 30 as illustrated in FIG. 4. When the hand unit 27 is provided in this manner, a hand opening and closing switch 28 for opening and closing the hand unit 27 is preferably provided on the handle 16A of the robot operating apparatus 13. For example, when the hand opening and closing switch 28 is pressed, a hand action command is sent to the robot control apparatus 18, so that the hand unit 27 is allowed to open and close.

The hand unit 27 may be configured to be closed for gripping the workpiece 26 when the hand opening and closing switch 28 is pressed and the hand unit 27 may be configured to be opened to release the workpiece 26 when the hand opening and closing switch 28 is pressed. In addition, the opening action and the closing action of the hand unit 27 may be switched alternately every time when the hand opening and closing switch 28 is pressed.

The hand opening and closing switch 28 is also preferably located at a position which allows the operator to press while gripping the handle 16A. A wall is preferably provided around the hand opening and closing switch 28 so as to prevent the operator from pressing the hand opening and closing switch 28 by mistake.

Second Embodiment

Subsequently, a second embodiment will be described. However, the same components as in the first embodiment are denoted by the same reference numerals and description will be omitted. Therefore, only points different from the components of the first embodiment will be described below.

Figure 5:
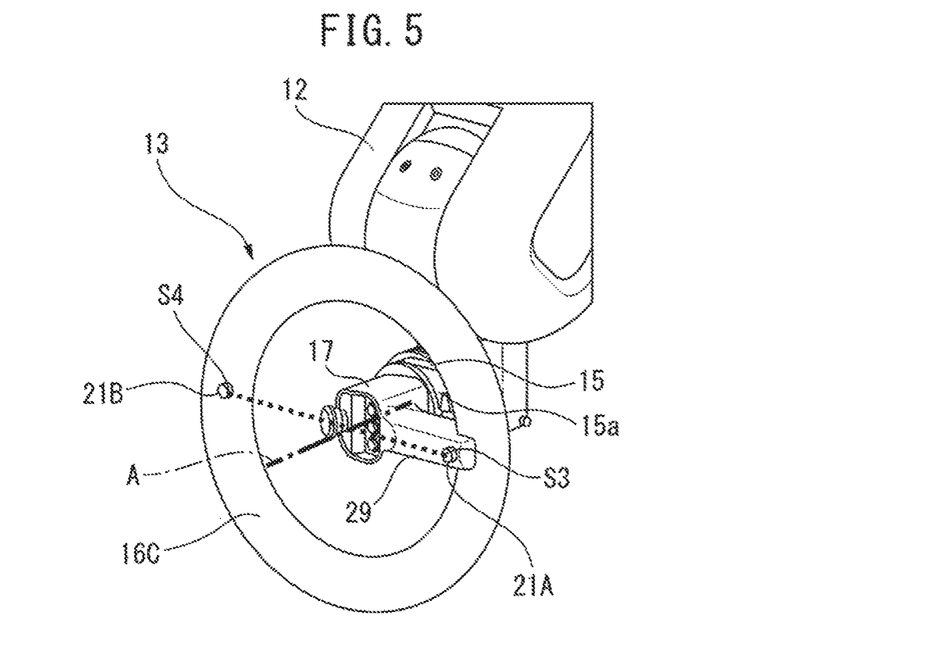
FIG. 5 is a perspective view of a robot operating apparatus according to a second embodiment.

FIG. 5 is a perspective view of a robot operating apparatus according to the second embodiment.

In the second embodiment, an annular handle 16C is supported by the handle supporting unit 17 as illustrated in FIG. 5. The handle supporting unit 17 is disposed at a center of the annular handle 16C. The annular handle 16C is provided integrally with the handle supporting unit 17 via an extension member 29.

A dot-and-dash line A illustrated in FIG. 5 indicates the extension line A of the force input axis of the force sensor 15 in the same manner as the first embodiment described above.

In addition, in the second embodiment described above; the two action permission switches 21A, 21B are provided respectively at two positions on the annular handle 16C. An operation of the arm unit 12 is preferably performed only when one of the two action permission switches 21A, 21B is pressed or only when the two action permission switches 21A, 21B are pressed simultaneously. When the operator moves the arm unit 12 while pressing the action permission switches 21A, 21B respectively with both hands, forces are applied mainly to a position S3 (i.e., a force point S3) in the vicinity of the action permission switch 21A on the handle 16C and a position S4 (i.e., a force point S4) in the vicinity of the action permission switch 21B on the handle 16C as illustrated in FIG. 5.

In the annular handle 16C as described above, preferably, a length of a perpendicular line extending from the force, point S3 down to the extension line A of the force input axis of the force sensor 15 described above and a length of a perpendicular line extending from the force point S4 down to the extension line A of the force input axis of the force sensor 15 described above are substantially the same (see a broken line in FIG. 5). With the configuration described above, since the force point S3 and the force point S4 are disposed on the circumference about the extension line A of the force input axis of the force sensor 15, a resultant force of forces applied to the force point S3 and the force point S4 on the annular handle 16C described above may be input to the force input axis of the force sensor 15 described above with a high degree of accuracy. In this embodiment, the two action permission switches 21A, 21B and the two force points S3, S4 are disposed respectively at positions symmetrical with respect to the extension line A of the force input axis of the force sensor 15.

With the annular handle 16C described above as well, the operator is able to apply a rotational force about an axial line that connects the force point S3 and the force point S4 easily to the arm unit 12 while gripping the annular handle 16C at positions on the handle 16C in the vicinity of the action permission switches 21A, 21B respectively with both hands.

Third Embodiment

Subsequently, a third embodiment will be described. However, the same components as in the first embodiments are denoted by the same reference numerals and description will be omitted. Therefore, only points different from the components of the first embodiment will be described below.

Figure 6:
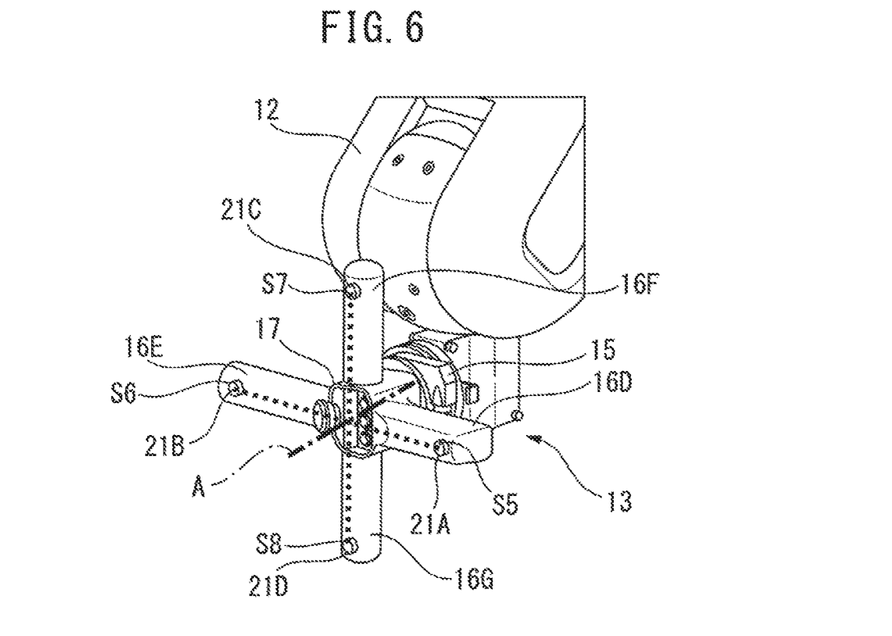
FIG. 6 is a perspective view illustrating a robot operating apparatus according to a third embodiment.

FIG. 6 is a perspective view of a robot operating apparatus according to the third embodiment.

In the third embodiment, four rod-shaped handles 16D, 16E, 16F, 16G are provided integrally with the handle supporting unit 17 so that the handles 16D, 16E, 16F, 16G project respectively sideways of the handle supporting unit 17 as illustrated in FIG. 6.

Furthermore, the two rod-shaped handles 16D, 16E are disposed in series, and the two rod-shaped handles 16F, 16G are disposed in series. The set of the two handles 16D, 16E and the set of the two handles 16F, 16G are disposed orthogonally to each other. In other words, a structure including the rod-shaped four handles 16D, 16E, 16F, 16G illustrated in FIG. 6 presents a mode of a substantially cross-shaped handle.

A dot-and-dash line A illustrated in FIG. 6 indicates the extension line A of the force input axis of the force sensor 15 in the same manner as the first embodiment described above.

In addition, in the third embodiment described above, the four action permission switches 21A, 21B, 21C, 21D are provided respectively on the four annular handles 16D, 16E, 16F, 16G. An operation of the arm unit 12 is preferably performed only when at least one of the four operation permission switches 21A, 21B, 21C, 21D is pressed. Alternatively, the operation of the arm unit 12 is preferably performed only when the two action permission switches 21A, 21B or the two operation permission switches 21C, 21D are pressed simultaneously. When the operator moves the arm unit 12 while pressing the action permission switches 21A, 21B respectively with both hands, a force is applied mainly to a position S5 (i.e., a force point S5) in the vicinity of the action permission switch 21A on the handle 16D as illustrated in FIG. 6. Furthermore, a force is applied mainly to a position S6 (i.e., a force point S6) in the vicinity of the action permission switch 21B on the handle 16E.

When the operator moves the arm unit 12 while pressing the action permission switches 21C, 21D respectively with both hands, forces are applied mainly to a position S7 (i.e., force point S7) in the vicinity of the action permission switch 21C on the handle 16F and a position S8 (i.e., a force point S8) in the vicinity of the action permission switch 21D on the handle 16G as illustrated in FIG. 6.

In the mode of the substantially cross-shaped handle as described above, preferably, a length of a perpendicular line extending from the force point S5 (or the force point S7) down to the extension line A of the force input axis of the force sensor 15 described above and a length of a perpendicular line extending from the force point S6 (or the force point S8) down to the extension line A of the force input axis of the force sensor 15 described above are substantially the same (see a broken line in FIG. 6). Accordingly, the force points S5, S6 (or the force points S7, S8) are disposed on the circumference about the extension line A of the force input axis of the force sensor 15. Therefore, a resultant force of forces acting on the force point S5 and the force point S6 of the two handles 16D, 16E described above or a resultant force of forces applied to the force point S7 and the force point S8 of the two handles 16F, 16G described above may be input to the force input axis of the force sensor 15 described above with a high degree of accuracy. In this embodiment, the two action permission switches 21A, 21B and the two force points S5, S6 are disposed respectively at positions symmetrical with respect to the extension line A of the force input axis of the force sensor 15. The two action permission switches 21C, 21D and the two force points S7, S8 are disposed respectively at positions symmetrical with respect to the extension line A of the force input axis of the force sensor 15.

In the mode of the substantially cross-shaped handle described above as well, the operator is able to apply a rotational force about an axial line that connects the force point S5 and the force point S6 easily to the arm unit 12 while gripping the two handles 16F, 16G respectively with both hands.

Fourth Embodiment

Subsequently, a fourth embodiment will be described. However, the same components as in the first embodiments are denoted by the same reference numerals and description will be omitted. Therefore, only points different from the components of the first embodiment will be described below.

Figure 7:
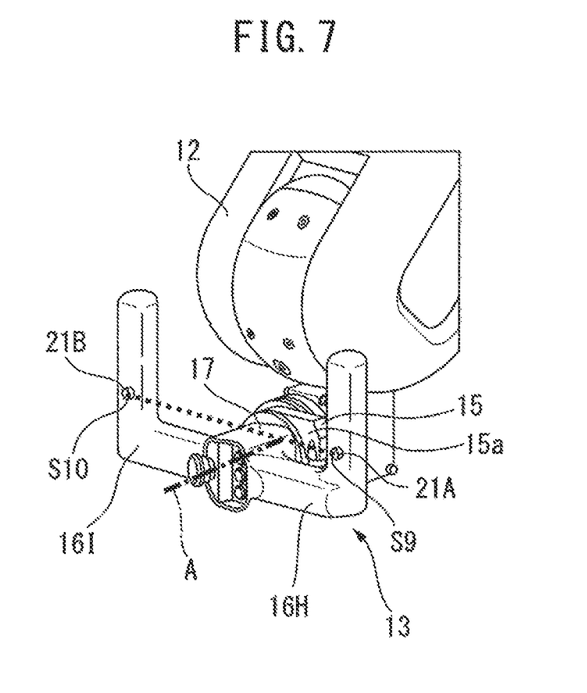
FIG. 7 is a perspective view illustrating the robot operating apparatus according to the third embodiment.

FIG. 7 is a perspective view of a robot operating apparatus according to the fourth embodiment.

In the fourth embodiment, two L-shaped handles 16H, 16I are provided respectively on both sides of the handle supporting unit 17 as illustrated in FIG. 7. The two handles 16H, 16I extend in parallel to each other in the same direction. The handles 16H, 16I are provided integrally with the handle supporting unit 17 so as to present a mode of a substantially U-shaped handle.

A dot-and-dash line A illustrated in FIG. 7 indicates the extension line A of the force input axis of the force sensor 15 in the same manner as the first embodiment described above.

In addition, in the fourth embodiment described above, the two action permission switches 21A, 21B are provided respectively on the two handles 16H, 16I. The operation of the arm unit 12 is preferably performed only when one of the two action permission switches 21A, 21B is pressed or only when the two action permission switches 21A, 21B are pressed simultaneously. When the operator moves the arm unit 12 while pressing the action permission switches 21A, 21B respectively with both hands, forces are applied mainly to a position S9 (i.e., a force point S9) in the vicinity of the action permission switch 21A on the handle 16H and a position S10 (i.e., a force point S10) in the vicinity of the action permission switch 21B on the handle 16I as illustrated in FIG. 7.

In the two handles 16H, 16I as described above, preferably, a length of a perpendicular line extending from the force point S9 down to the extension line A of the force input axis of the force sensor 15 described above and a length of a perpendicular line extending from the force point S10 down to the extension line A of the force input axis of the force sensor 15 described above are substantially the same (see a broken line in FIG. 7). With the configuration described above, since the force point S9 and the force point S10 are disposed on the circumference about the extension line A of the force input axis of the force sensor 15, a resultant force of forces applied to the force point S9 and the force point S10 of the two handles 16H, 16I described above may be input to the force input axis of the force sensor 15 described above with a high degree of accuracy.

With the L-shaped two handles 16H, 16I described above as well, the operator is able to apply a rotational force about an axial line that connects the force point S9 and the force point S10 easily to the arm unit 12 while gripping the two handles 16H, 16I with both hands.

In each of the second embodiment, the third embodiment, and the fourth embodiment as described above as well, the speed change switch 22, the action mode change-over switch 23, the teaching switch 24, and the emergency stop switch 25 similar to those provided in the first embodiment described above are preferably provided on the handle supporting unit 17.

According to the respective embodiments described above, forces are applied from at least two force points (S1 to S10) by the operator gripping the handle structure with both hands when the operator moves the distal end part of the arm unit 12. Accordingly, as regards a direction in which application of a force to the arm unit 12 is difficult by only applying a force from one force point, a force may be applied easily to the arm unit 12 by applying a force from another force point. Therefore, the distal end part of the arm unit 12 may be moved easily as the operator intends.

Although the strain gauge-type force sensor is used as the force sensor 15 in the respective embodiments, the present invention is not limited thereto. For example, a capacitance force sensor or a force sensor configured to detect displacement by an applied force may be used as the force sensor 15. In the robot operating apparatus 13 of the respective embodiments, a torque sensor or a moment detector may be used instead of the force sensor 15 as an apparatus that detects a force, torque, or moment applied to the robot operating apparatus 13 by the operator.

Although typical embodiments have been described thus far, the present invention is not limited to the respective embodiments described above, and various modifications may be made on shape, structure, and material of the respective embodiments of the present invention without departing from the scope of the present invention.

Advantageous Effects of the Invention

According to the first aspect of the present invention, as the operator is able to apply a force to the arm unit while gripping the handle structure with both hands, the operator may easily move the distal end part of the arm unit as intended even in the direction in which the application of a force to the arm unit is difficult by only applying a force from one force point.

According to the second or the third aspect, when danger occurs in operation of the arm unit of the robot by the operator, the movement of the arm unit may be stopped immediately by stopping pressing of the switches.

According to the fourth aspect, since the two force points are disposed on the circumference about the extension line of the force input axis of the sensor configured to detect a force or moment, a resultant force of forces applied to the two force points may be input to the force input axis of the sensor with a high degree of accuracy.

According to the fifth aspect of the present invention, with the provision of the speed change switch on the robot operating apparatus, the speed of movement of the distal end part of the arm unit may be set to a predetermined speed.

According to the sixth aspect of the present invention, with the provision of the action mode change-over switch on the robot operating apparatus, the action taken when the distal end part of the arm unit is moved may be fixed to the translational action, the rotational action, or the translational and rotational action.

According to the seventh aspect of the present invention, with the provision of the teaching switch on the robot operating apparatus, the action of the arm unit caused by the robot operating apparatus may be instructed to the control apparatus.

According to the eighth aspect of the present invention, when the hand unit is provided on the distal end part of the arm unit via the bracket, opening and closing of the hand unit may be performed by the hand opening and closing switch.

The invention claimed is:

1. A robot operating apparatus comprising:
a sensor mounted on the distal end part of an arm unit of an industrial robot that is controlled by a control apparatus and configured to detect a force or moment along a force input axis of the sensor;
a handle supporting unit mounted on the distal end part of the arm unit via the sensor, and wherein the robot operating apparatus is configured to send the force or the moment detected by the sensor to the control apparatus in a form of an electric signal to move the distal end part of the arm unit in accordance with a direction and a magnitude of the force or the moment detected by the sensor; and
two rod-shaped handles are provided respectively on both sides of the handle supporting unit, the two rod-shaped handles including:
a first rod-shaped handle extending from a first distal end along a first axis that intersects the force input axis of the sensor, and
a second rod-shaped handle extending from a second distal end along a second axis that does not intersect the force input axis of the sensor.

* * * * *